United States Patent
Park

(10) Patent No.: US 9,298,296 B2
(45) Date of Patent: Mar. 29, 2016

(54) ELECTRONIC APPARATUS AND METHOD OF CONTROL THEREOF

(71) Applicant: Samsung Electronics Co., Ltd, Suwon-si, Gyeonggi-do (KR)

(72) Inventor: Seung-joon Park, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 114 days.

(21) Appl. No.: 13/897,636

(22) Filed: May 20, 2013

(65) Prior Publication Data

US 2014/0043259 A1 Feb. 13, 2014

(30) Foreign Application Priority Data

Aug. 8, 2012 (KR) .................. 10-2012-0086811

(51) Int. Cl.
*G06F 3/044* (2006.01)
*G06F 3/041* (2006.01)
*G06F 1/16* (2006.01)
*G06F 1/32* (2006.01)

(52) U.S. Cl.
CPC .............. *G06F 3/0412* (2013.01); *G06F 1/169* (2013.01); *G06F 1/1618* (2013.01); *G06F 1/1677* (2013.01); *G06F 1/1698* (2013.01); *G06F 1/3231* (2013.01); *Y02B 60/1289* (2013.01)

(58) Field of Classification Search
CPC .. G06F 1/1618; G06F 1/1616; Y02B 60/1289
USPC ............. 345/156, 157, 173, 177; 361/679.06, 361/679.26, 679.27; 700/299
See application file for complete search history.

(56) References Cited

U.S. PATENT DOCUMENTS

| | | | |
|---|---|---|---|
| 2008/0012835 A1* | 1/2008 | Rimon et al. | 345/173 |
| 2010/0182265 A1* | 7/2010 | Kim et al. | 345/173 |
| 2010/0298032 A1* | 11/2010 | Lee et al. | 455/566 |
| 2011/0301778 A1* | 12/2011 | Liang et al. | 700/299 |

* cited by examiner

*Primary Examiner* — Ariel Balaoing
*Assistant Examiner* — Sepehr Azari
(74) *Attorney, Agent, or Firm* — Staas & Halsey LLP

(57) ABSTRACT

An electronic apparatus and a control method therefor provide an apparatus that includes a first body that includes a display part, a second body that includes a touchpad to change a sensing sensitivity, a hinge part to connect the first body and the second body and to rotate 360 degrees, and a controller to change an operation mode of the electronic apparatus according to an angle of the first body and the second body, and to increase the sensing sensitivity of the touchpad so that the touchpad detects human body contact when the first body and the second body form a preset angle.

25 Claims, 15 Drawing Sheets

121

ELECTRONIC APPARATUS AND METHOD OF CONTROL THEREOF

CROSS-REFERENCE TO RELATED APPLICATIONS

This application claims the benefit under 35 U.S.C. §119 (a) from Korean Patent Application No. 2012-86811 filed on Aug. 8, 2012 in the Korean Intellectual Property Office, the entire disclosure of which is incorporated herein by reference.

BACKGROUND

1. Field

The present general inventive concept relates generally to an electronic apparatus and a control method thereof. More particularly, the present general inventive concept relates to an electronic apparatus which includes a first body including a display part and a second body including a touchpad to change sensing sensitivity, and a control method thereof.

2. Description of the Related Art

Thanks to recent technological advances, various electronic products are developed and supplied. In particular, in response to users' demand, electronic devices focusing on portability and mobility are under development. To drive various applications, the electronic device includes diverse sensors. Among them, a proximity sensor detects approach or contact of a human body.

When the proximity sensor is added to detect the approach and the contact of the human body, a manufacturing cost of the electronic device increases and the device design structure becomes complicated. Hence, an apparatus for replacing the proximity sensor is needed.

SUMMARY

The present general inventive concept has been provided to solve the above-mentioned and/or other problems and disadvantages. The present general inventive concept provides an electronic apparatus to detect contact of a human body in place of a proximity sensor, using a touchpad to change sensing sensitivity, and a control method thereof.

Additional features and utilities of the present general inventive concept will be set forth in part in the description which follows and, in part, will be obvious from the description, or may be learned by practice of the general inventive concept.

Exemplary embodiments of the present general inventive concept provide an electronic apparatus that includes a first body having a display part, a second body that includes a touchpad to change a sensing sensitivity, a hinge part to connect the first body and the second body and to rotate 360 degrees, and a controller to change an operation mode of the electronic apparatus according to an angle of the first body and the second body, and to increase the sensing sensitivity of the touchpad so that the touchpad detects human body contact when the first body and the second body form a preset angle.

When the first body and the second body form a first preset angle, the controller may change the operation mode of the electronic apparatus to a tablet mode (the electronic apparatus may be referred to as a "tablet"). When the first body and the second body form a second preset angle, the controller may change the operation mode of the electronic apparatus to an electronic notebook mode.

When the touchpad having the increased sensing sensitivity detects the human body contact, the controller may change at least one of an operating frequency of the electronic apparatus and a rotation speed of a cooling fan of the electronic apparatus.

The electronic apparatus may further include a wireless communication part to communicate with an external device using an antenna. When the touchpad of the increased sensing sensitivity detects the human body contact, the controller may decrease the power of the antenna.

When the touchpad having the increased sensing sensitivity detects the human body contact, the controller may provide a preset User Interface (UI) to the display part.

The electronic apparatus may include a vibration part. When the touchpad having the increased sensing sensitivity detects the human body contact, the controller may control the vibration part to vibrate during a preset time.

To change the sensitivity, the touchpad may adjust a sensing threshold of a touchpad capacitance which varies according to an approach of the human body.

Exemplary embodiments of the present general inventive concept may also provide an electronic apparatus that includes a first body having a display part, a second body that includes a touchpad to change a sensing sensitivity, a hinge part to connect the first body and the second body, and a controller to change the sensing sensitivity of the touchpad to detect contact of a human body, according to an angle of the first body and the second body.

When the first body and the second body form a first preset angle, the controller may detect the human body contact by increasing the sensing sensitivity of the touchpad.

When the touchpad having the increased sensing sensitivity detects the human body contact, the controller may change at least one of an operating frequency of the electronic apparatus and a rotation speed of a cooling fan of the electronic apparatus.

The electronic apparatus may further include a wireless communication part to communicate with an external device using an antenna. When the touchpad of the increased sensing sensitivity detects the human body contact, the controller may decrease a power of the antenna.

To change the sensitivity, the touchpad may adjust a sensing threshold of a touchpad capacitance which varies according to an approach of the human body.

Exemplary embodiments of the present general inventive concept may also provide a control method of an electronic apparatus which includes a first body that has a display part, a second body that includes a touchpad to change a sensing sensitivity, and a hinge part to connect the first body and the second body and to rotate 360 degrees, the method including detecting an angle of the first body and the second body, changing an operation mode of the electronic apparatus according to the angle of the first body and the second body, and when the first body and the second body form a preset angle, includes increasing the sensing sensitivity of the touchpad so that the touchpad detects human body contact.

The operation to change the operation mode may include, when the first body and the second body form a first preset angle, changing the operation mode of the electronic apparatus to a tablet mode, and when the first body and the second body form a second preset angle, changing the operation mode of the electronic apparatus to an electronic notebook mode.

The control method may include that when the touchpad of the increased sensing sensitivity detects the human body contact, changing at least one of an operating frequency of the electronic apparatus and a rotation speed of a cooling fan of the electronic apparatus.

The control method may include that when the touchpad of the increased sensing sensitivity detects the human body contact, decreasing a power of the antenna of the electronic apparatus.

The control method may include that when the touchpad having the increased sensing sensitivity detects the human body contact, providing a preset User Interface (UI) to the display part.

The control method may further include that when the touchpad having the increased sensing sensitivity detects the human body contact, controlling a vibration part of the electronic apparatus to vibrate during a preset time.

To change the sensitivity, the touchpad may adjust a sensing threshold of a touchpad capacitance which varies according to an approach of the human body.

Exemplary embodiments of the present general inventive concept may also provide an electronic apparatus that includes a hinged display-touchpad arranged to rotate 360 degrees and having a preset angle formed by a display coupled to a touchpad by a hinge and a controller that detects the preset angle formed by the display and the touchpad, that changes an operation mode of the electronic apparatus according to the preset angle formed by the display with the touch pad, and that increases the sensing sensitivity of the touchpad so that the touchpad detects human body contact when the display and the touchpad form the preset angle.

The electronic apparatus may further include a wireless communication part, a sensor part, a storage, and a vibration part.

When the preset angle is an angle between about zero degrees and about 30 degrees the operation mode of the electronic apparatus is a power-saving mode. When the preset angle is an angle between about 30 degrees and about 180 degrees, the operation mode of the electronic apparatus is an electronic notebook or book mode, and when the preset angle is an angle between about 60 degrees and about 180 degrees, the operation mode of the electronic apparatus is a clamshell mode. When the preset angle is an angle from about 180 degrees to about 360 degrees, the operation mode of the electronic apparatus is a tent mode. Within the tent mode, when the preset angle is an angle from about 270 degrees to about 360 degrees, the operation mode of the electronic apparatus is a stand mode, and when the preset angle is an angle of about 360 degrees, the operation mode of the electronic apparatus is a tablet mode.

Exemplary embodiments of the present general inventive concept may also provide a control method of an electronic apparatus which includes a first body that includes a display part, a second body that includes a touchpad to change a sensing sensitivity, and a hinge part to connect the first body and the second body and to rotate 360 degrees, the method including detecting an angle of the first body and the second body, changing a sensing sensitivity of the touchpad according to the detected angle, and repeatedly determining whether the electronic apparatus has contacted a human body until contact with a human body occurs, and executing a preset control operation according to the detected angle.

The preset control operation may be a power-saving mode, an electronic notebook or book mode (which may include a clamshell mode), and a tent mode (which may include a stand mode or a tablet mode).

Exemplary embodiments of the present general inventive concept may also provide an electronic apparatus that includes a tablet having a first body connected to a second body by a hinge where the first body is rotated to form a preset angle of 360 degrees with the second body, and a controller to detect the preset angle formed by the first body with the second body, to set an operation mode of the electronic apparatus according to the preset angle formed by the first body with the second body, and to increase a sensing sensitivity of the second body so that the second body detects human body contact when the first body and the second body form the preset angle. The first body may be a display, and the second body may be a touch pad.

Exemplary embodiments of the present general inventive concept may also provide an electronic apparatus that includes an electronic notebook or book having a first body connected to a second body by a hinge where the first body is rotated to form a preset angle between about 30 degrees and about 180 degrees with the second body, and a controller to detect the preset angle formed by the first body with the second body, to set an operation mode of the electronic apparatus according to the preset angle formed by the first body with the second body, and to increase a sensing sensitivity of the second body so that the second body detects human body contact when the first body and the second body form the preset angle. The first body may be a display, and the second body may be a touchpad.

When the preset angle is an angle between about 60 degrees and about 180 degrees, the operation mode of the electronic apparatus is a clamshell mode.

Exemplary embodiments of the present general inventive concept may also provide a computer-readable recording medium that has a program to fulfill a control method of an electronic apparatus which includes a first body that has a display part, a second body that has a touchpad to change a sensing sensitivity, and a hinge part to connect the first body and the second body and to rotate 360 degrees. The method includes detecting an angle of the first body and the second body, changing an operation mode of the electronic apparatus according to the angle of the first body and the second body, and when the first body and the second body form a preset angle, increasing the sensing sensitivity of the touchpad so that the touchpad detects human body contact.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION

Figure 1:
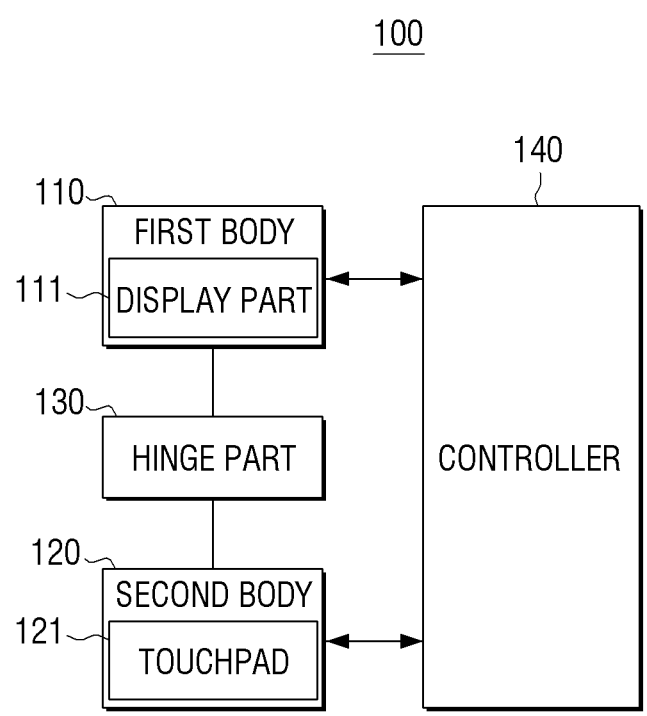
FIG. 1 is a block diagram illustrating an electronic apparatus according to exemplary embodiments of the present general inventive concept.

Reference will now be made in detail to the embodiments of the present general inventive concept, examples of which are illustrated in the accompanying drawings, wherein like reference numerals refer to the like elements throughout. The embodiments are described below to explain the present general inventive concept by referring to the figures.

Herein, an electronic apparatus may be implemented using a laptop computer, a tablet computer, a Personal Computer (PC), a Portable Multimedia Player (PMP), a Personal Digital Assistant (PDA), a smart phone, a mobile phone, a digital frame, and a game console.

FIG. 1, numeral 100, is a block diagram of an electronic apparatus according to exemplary embodiments of the present general inventive concept.

Referring to FIG. 1, the electronic apparatus includes a first body 110, a second body 120, a hinge part 130, and a controller 140.

The first body 110 includes a display part 111. In detail, the first body 110 may further include an embedded camera and a speaker in addition to the display part 111.

The display part 111 displays a multimedia content play screen, an application execution screen, a background screen including an icon, and a web browsing screen under control of the controller 140. The display part 111 may be implemented using a touch screen and may receive at least one touch gesture of the human body (e.g., the fingers including the thumb) of a user or a detectable input device (e.g., a stylus pen).

The second body 120 includes a touchpad 121 capable of changing sensing sensitivity. In addition to the touchpad 121, the second body 120 may include a user interface for input and output, such as a keyboard 122, a trackball, and an information display, e.g., a liquid crystal display (LCD), an organic light emitting diode (OLED) display, etc.

The touchpad 121 detects a press or a drag of the human body (e.g., the fingers including the thumb) of the user or the detectable input device (e.g., a stylus pen), and inputs pointing information to the electronic apparatus 100. The touchpad 121 may be self-adjusting, or alternatively, may be adjusted by the controller 140.

According to exemplary embodiments of the present general inventive concept, the touchpad 121 may adjust its sensing sensitivity, and thus replace a proximity sensor which detects the contact of the user's body. Detailed structure and operations of the touchpad 121 shall be explained in detail by referring to FIGS. 7, 8 and 9.

The hinge part 130 connects the first body 110 and the second body 120. In detail, the hinge part 130 may include two hinges disposed above and below, respectively, the joint of the first body 110 and the second body 120. The hinge part 130 may include a single hinge covering the whole joint of the first body 110 and the second body 120.

The hinge part 130 may include a hinge sensor to detect an angle and a movement of the hinge therein. The hinge sensor shall be explained with a sensor part 160 of FIG. 2.

The first body 110 and the second body 120 may rotate based on the hinge part 130. Hence, the first body 110 and the second body 120 may be closed to meet each other, or may be completely folded back (360 degrees) and opened such that respective rear sides 135, 133 (See FIG. 6) of the first body 110 and the second body 120 are in contact. That is, 360-degree rotation is allowed.

Figure 5:
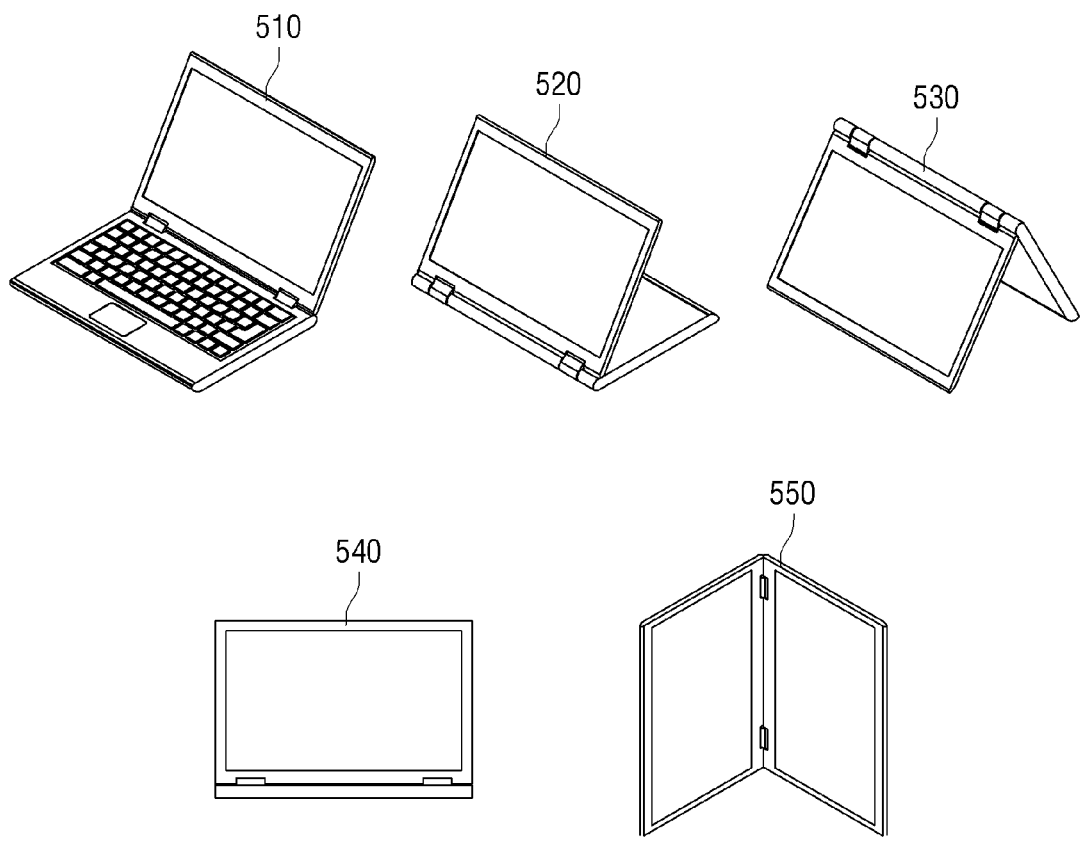
FIG. 5 illustrates operation modes corresponding to an angle and a position of a first body and a second body of the electronic apparatus according to exemplary embodiments of the present general inventive concept.
Figure 6:
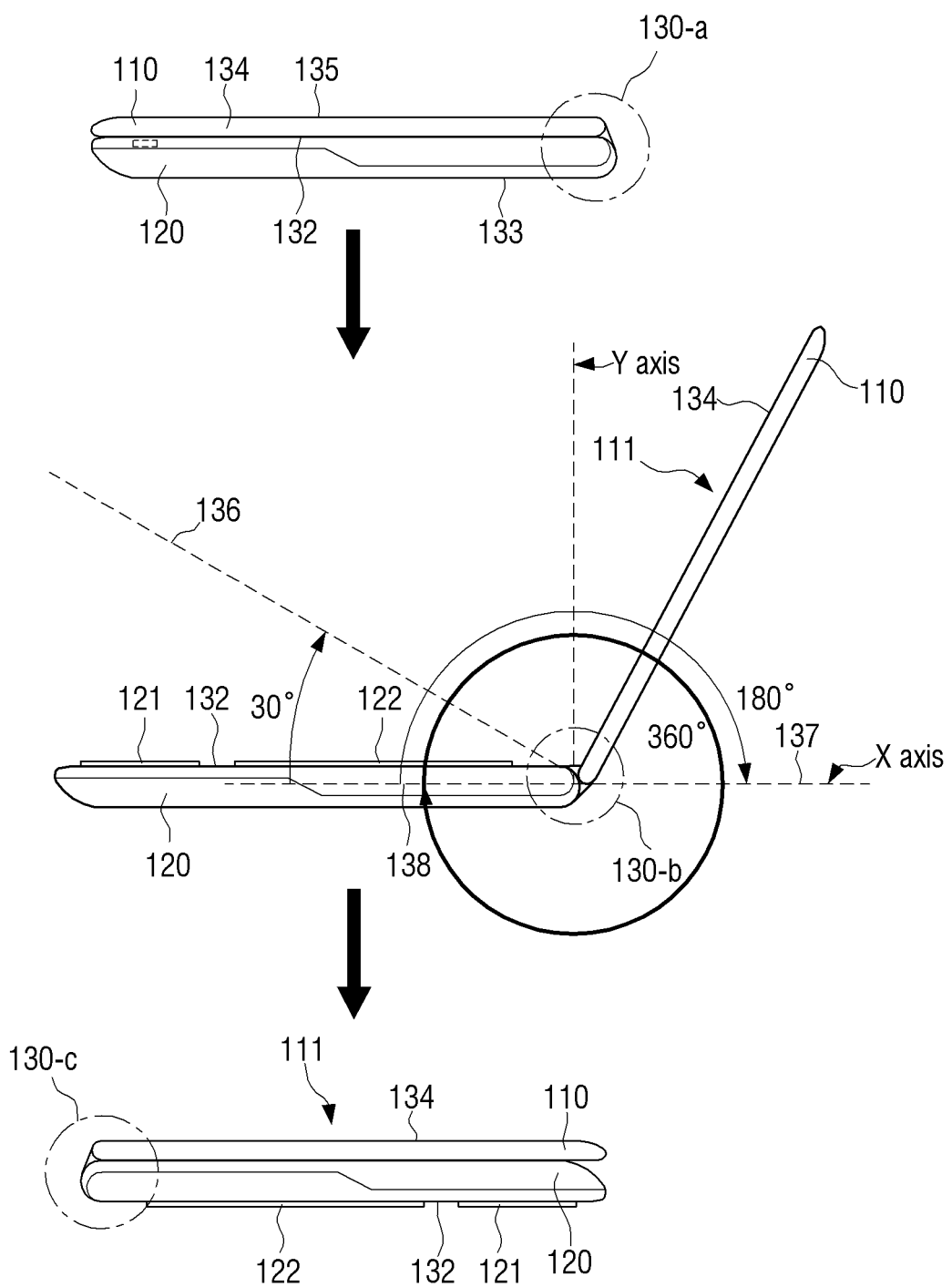
FIG. 6 illustrates rotation of a hinge part of the electronic apparatus according to exemplary embodiments of the present general inventive concept.

The rotation of the first body 110 and the second body 120 based on the hinge part 130 shall be explained in detail by referring to FIGS. 5 and 6.

The controller 140 changes an operation mode of the electronic apparatus according to the angle of the first body 110 and the second body 120, and increases the sensing sensitivity of the touchpad 121 when the first body 110 and the second body 120 are adjusted so as to form a preset angle between one another.

The operation mode indicates a status of the electronic apparatus 100 to provide an interface or a particular task to the user in accordance with the angle of the first body 110 and the second body 120.

For example, the operation mode may include a power-saving mode when the angle of the first body 110 and the second body 120 is between 0 degrees and 30 degrees (see FIG. 6; between dashed line 138 and dashed line 136), an electronic notebook mode between 30 degrees and 180 degrees (see FIG. 6; between dashed line 136 and dashed line 137), and a tablet mode between 180 degrees and 360 degrees (see FIG. 6; between dashed line 137 and dashed line 138). The power-saving mode discontinues power to the display part 111 and operates the electronic apparatus 100 with minimum power.

The electronic notebook mode activates the functions of all of the components of the electronic apparatus 100 and may receive a user manipulation using the display part 111, the touchpad 121, and other input device. The tablet mode uses the electronic apparatus 100 through the display part 111 disposed in the first body 110.

In the tablet mode, the rear side 133 of the second body 120 is placed against the rear side 135 of the first body 110. Accordingly, when the user grabs the electronic apparatus 100 with the hand or puts the electronic apparatus on the table or on his/her knees, the user's unintended manipulation information may be input to the electronic apparatus 100 through the touchpad 121 or other input device disposed in the second body 120. Thus, the electronic apparatus 100 of the tablet mode may block the input information from being sent to an Operating System (OS) by receiving the information through the display part 111 and deactivating the input functions of the touchpad 121 or the other input device disposed in the second body 120.

Yet, according to exemplary embodiments of the present general inventive concept, the deactivation of the input function of the touchpad 121 in the tablet mode indicates that the user's touch input is blocked from sending the input information to the operating system (OS), rather than deactivating the touchpad 121 (e.g., deactivating the functionality of the touchpad). When the electronic apparatus 100 enters the tablet mode, the controller 140 may detect the contact of the human body by increasing the sensing sensitivity of the touchpad 121.

Although three operation modes are mentioned by way of example, various operation modes may be provided according to the angle of the first body 110 and the second body 120.

When the first body 110 and the second body 120 form a first angle which is the preset angle, the operation mode of the electronic apparatus 100 may be changed to the tablet mode. When the first body 110 and the second body 120 form a second preset angle, the operation mode of the electronic apparatus 100 may be changed to the electronic notebook mode.

Herein, the first preset angle may range, for example, between about 180 degrees and about 360 degrees. The second preset angle may range, for example, between about 30 degrees and about 180 degrees.

In response to the angle of the first body 110 and the second body 120, the controller 140 may change the sensing sensitivity of the touchpad 121 to detect the contact of the human body.

In this case, when the angle of the first body 110 and the second body 120 is the first preset angle, the controller 140 may detect the human body contact by increasing the sensing sensitivity. For example, the first preset angle ranges from about 180 degrees to about 360 degrees based on the hinge, and the operation mode of the electronic apparatus 100 may be the tablet mode. In the tablet mode, the preset angle is about 360 degrees, and since the electronic apparatus 100 may detect the human body contact of the tablet's side, i.e., the front side 132 of the second body 120, by increasing the sensing sensitivity of the touchpad 121 disposed in the second body 120, the electronic apparatus 100 may detect the human body contact without the proximity sensor.

How to increase the sensing sensitivity of the touchpad 121 will be explained in detail by referring to FIGS. 8 and 9.

Alternatively, when the touchpad 121 of the increased sensing sensitivity detects the human body contact, the controller 140 may change at least one of an operating frequency of the electronic apparatus 100 and a rotation speed of a cooling fan of the electronic apparatus 100. In detail, when the knee or other portion of the human body contacts the side, i.e., the front side 132 of the second body 120, of the electronic apparatus 100 in the tablet mode, the controller 140 may adjust the temperature of the electronic apparatus 100 below a certain level by decreasing the operating frequency (or controller 140 clock) (CPU-CLOCK) of the electronic apparatus 100 and increasing the rotation speed of the cooling fan.

Hence, it is possible to address an inconvenience of the user in using the high-temperature electronic apparatus 100.

In exemplary embodiments of the present general inventive concepts, when the touchpad 121 of the increased sensing sensitivity detects the contact of the human body, the controller 140 may decrease a power of an antenna 151 (i.e., a transmission power of the antenna 151). In detail, when the knee or other portion of the human body contacts the rear side of the electronic apparatus 100 in the tablet mode, the controller 140 may decrease the transmission power of the antenna 151 of a wireless communication part 150, and thus reduce electromagnetic waves.

The power of the antenna 151 may be reduced by detecting the human body using the touchpad 121, without having to add the proximity sensor to detect the contact of the human body to the electronic apparatus in order to meet the Specific Absorption Rate (SAR) standard. Thus, the production cost may be reduced, and the design may be simplified.

When the touchpad 121 of the increased sensing sensitivity detects the contact of the human body, the controller 140 may provide a preset User Interface (UI) to the display part 111. In detail, when the knee or other portion of the human body contacts the rear side of the electronic apparatus 100 in the tablet mode, the controller 140 may display an alert window informing the user of the human body contact, or a display window indicating status information of the electronic apparatus 100 on the display part 111.

According to exemplary embodiments of the present general inventive concepts, when the touchpad 121 of the increased sensing sensitivity detects the human body contact, the controller 140 may control a vibration part 180 to vibrate during a preset time. In detail, when the knee or other portion of the human body contacts the rear side 133 of the second body of the electronic apparatus 100 in the tablet mode, the controller 140 may control the vibration part 180 to thus provide haptic effects according to the human body contact.

The controller 140 may control the components of the electronic apparatus 100. For example, the controller 140 may be a field programmable gate array, an integrated circuit, a programmable logic device, a digital signal processor, or the like. Components controlled by the controller 140 may include, for example, the wireless communication part 150 to communicate with external devices, a sensor part 160 such as a geomagnetic sensor to calculate an angle between the first body 110 and the second body 120, a storage 170 to store, for example, a control program of the controller 140, and the vibration part 180 to convert an electrical signal to a mechanical vibration to provide vibration for a predetermined period of time that is set by the controller.

Figure 2:
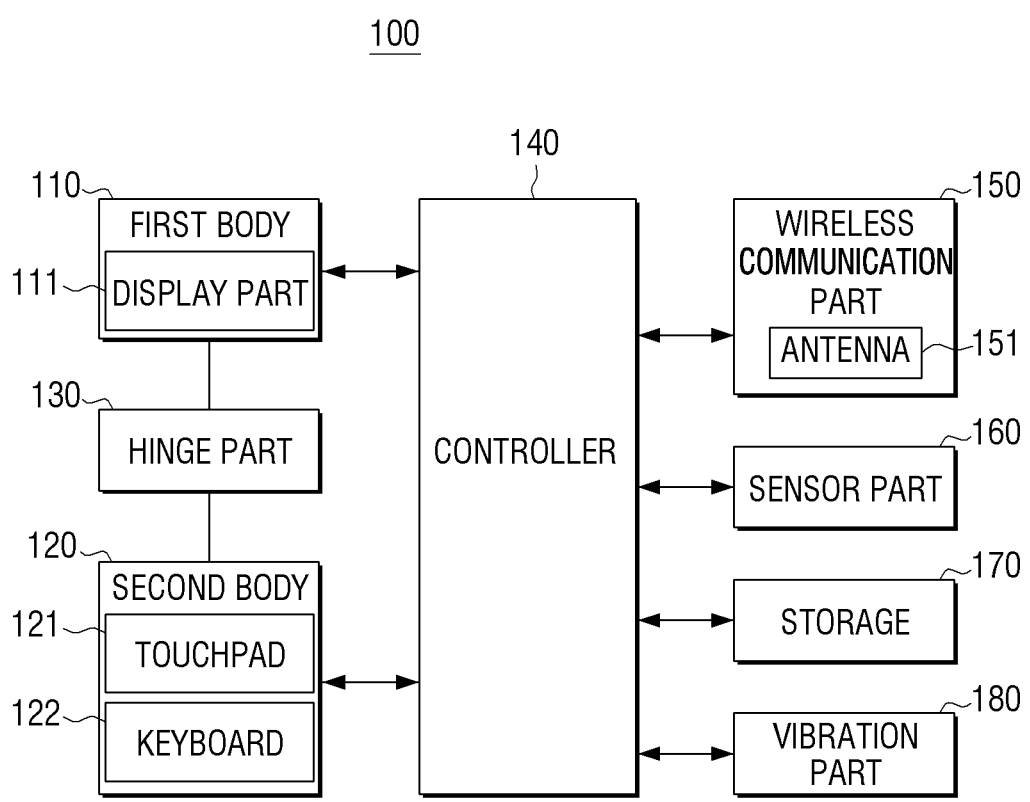
FIG. 2 is a block diagram illustrating the electronic apparatus according to exemplary embodiments of the present general inventive concept.

FIG. 2 is a block diagram of the electronic apparatus according to exemplary embodiments of the present general inventive concept.

Referring to FIG. 2, the electronic apparatus 100 may include the first body 110, the second body 120, the hinge part 130, the controller 140, the wireless communication part 150, the sensor 160, the storage 170, and the vibration part 180.

The operations of the first body 110, the second body 120, the hinge part 130, the controller 140, the display part 111, and the touchpad 121 in FIG. 2 have been described in detail and shall be omitted here.

As illustrated in FIG. 2, the wireless communication part 150 may communicate with an external device using the antenna 151. In detail, the wireless communication part 150 may send wireless transmissions to send/receive wireless data signals so as to communicate with various external devices according to various communication schemes. The wireless communication part 150 may include various communication modules such as a broadcasting reception module, a short-range wireless communication module, a wireless communication module, and a GPS module.

Herein, the external device may include at least one of other devices, a mobile phone, a smartphone, a tablet computer, a computer server, and a digital TV.

The sensor part 160 may calculate the angle of the first body 110 and the second body 120. In detail, the sensor part 160 includes any one of a geomagnetic sensor, an acceleration sensor, a hinge sensor, and a touch sensor.

To calculate the angle of the first body 110 and the second body 120, the sensor part 160 may detect the locations of the first body 110 and the second body 120 using, for example, the geomagnetic sensor and the acceleration sensor. The angle of the first body 110 and the second body 120 may be detected using the hinge sensor embedded in the hinge part 130 beside the geomagnetic sensor and the acceleration sensor. The hinge sensor includes any one of a hall sensor, a pressure sensor, an induction detection sensor, an electric contact sensor, and an optical sensor, and may calculate the angle of the first body 110 and the second body 120 by detecting the movement and the relative position of the hinge.

The touch sensor is a sensor to detect the user's touch on the display part 111. The touch sensor may be classified into an electrostatic type and a piezoelectric type based on the user's touch detection. In this embodiment of the present general inventive concept, the touch sensor may be implemented using two types of sensors. The touch sensor may form the display part 111 together with a display panel.

The touch sensor is a sensor to input an instruction displayed on the display screen by pressing the display part 111 with a portion of the human body such as a finger or a detectable input device. The touch sensor utilizes a capacitance change, a resistance change, or a light quantity change to detect the user's touch on the display part 111.

The geomagnetic sensor may detect the azimuth by detecting the geomagnetic field, and thus may detect the direction of movement of the electronic apparatus 100. The acceleration sensor measures the dynamic force such as an acceleration, a vibration, or an impact of the object by processing the output signal, and detects the velocity change or the force exerted on the electronic apparatus 100. The hinge sensor may detect the angle or the movement of the hinge.

A status of the sensors may be detected by the sensor part 160, a signal may be generated by the sensor part 160 corresponding to the detection, and the signal may be sent to the controller 140. The sensors of the sensor part 160 may be added or deleted according to the performance of the electronic apparatus 100.

The storage 170 stores various multimedia data processed by the controller 140 (e.g., text, images, audio, video, and graphic objects), contents data (e.g., a table of contents for a multimedia file), and data received from an external source.

In detail, under the control of the controller 140, the storage 170 may store the input/output signal, information, or data according to the operations of the display part 111, the touchpad 121, the keyboard 122, the wireless communication part 150, the sensor part 160, and the vibration part 180.

The storage 170 may store a control program to control the electronic apparatus 100 or the controller 140, and applications. Hereafter, the term "storage" may include the storage 170, a read only memory (ROM), a random access memory (RAM), or an attachable/detachable memory card (e.g., a secure digital (SD) card and a memory stick) of the electronic apparatus 100. The storage 170 may include a non-volatile memory, a volatile memory, a Hard Disc Drive (HDD), or a Solid State Drive (SSD).

The vibration part 180 may convert the electrical signal to a mechanical vibration under the control of the controller 140. In detail, when the touchpad 121 of the increased sensing sensitivity detects the human body contact, the vibration part 180 may vibrate during a preset time under the control of the controller 140.

The second body 120 or the first body 110 of the electronic apparatus 100 may include the single or multiple vibration parts 180. The vibration part 180 may operate in response to the user's touch gesture or the continuous touch detected on the display part 111.

As such, the electronic apparatus 100 may detect the contact of the human body in lieu of the proximity sensor by using the touchpad 121 to change the sensing sensitivity.

Hereafter, the arrangement of the components of the electronic apparatus 100 according to exemplary embodiments of the present general inventive concepts are described.

Figure 3:
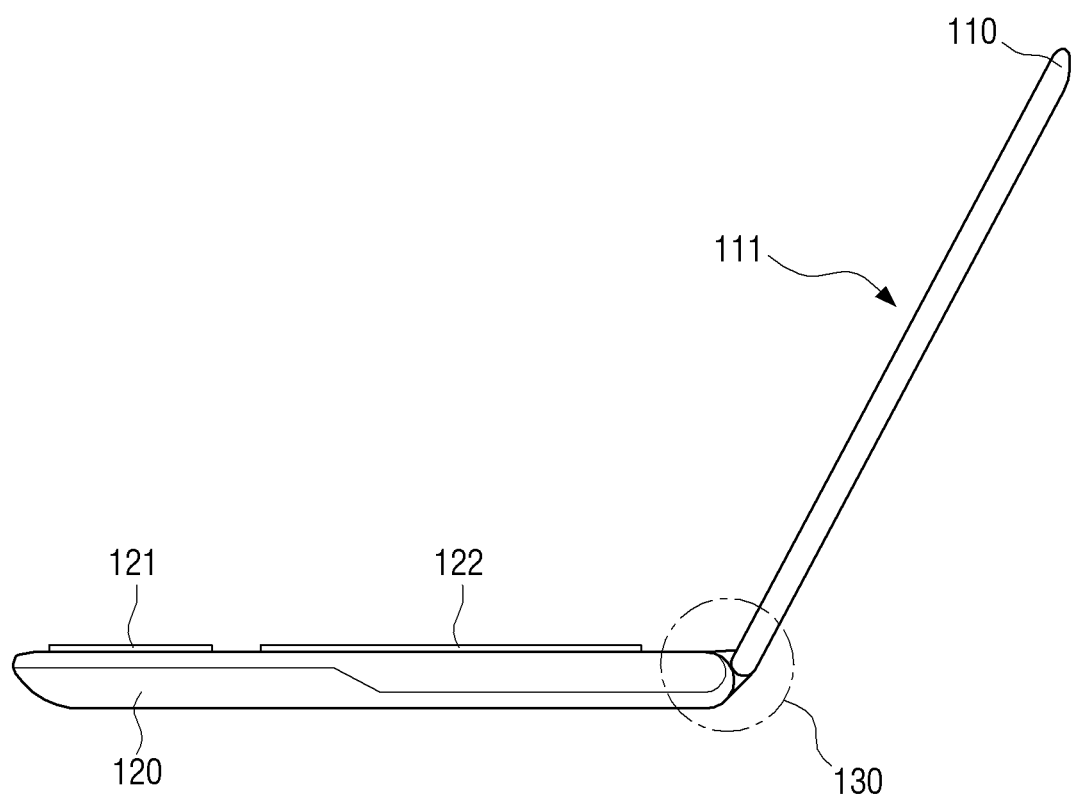
FIG. 3 illustrates the electronic apparatus according to exemplary embodiments of the present general inventive concept.

FIG. 3 illustrates the electronic apparatus 100 according to exemplary embodiments of the present general inventive concept.

Referring to FIGS. 3 and 6, in the electronic apparatus 100 according to exemplary embodiments of the present general inventive concept, the display part 111 is disposed in the front side 134 of the first body 110, and the keyboard 122 and the touchpad 121 are disposed in the front side 132 of the second body 120.

The first body 110 and the second body 120 may be connected using the hinge part 130, which may rotate.

Figure 4:
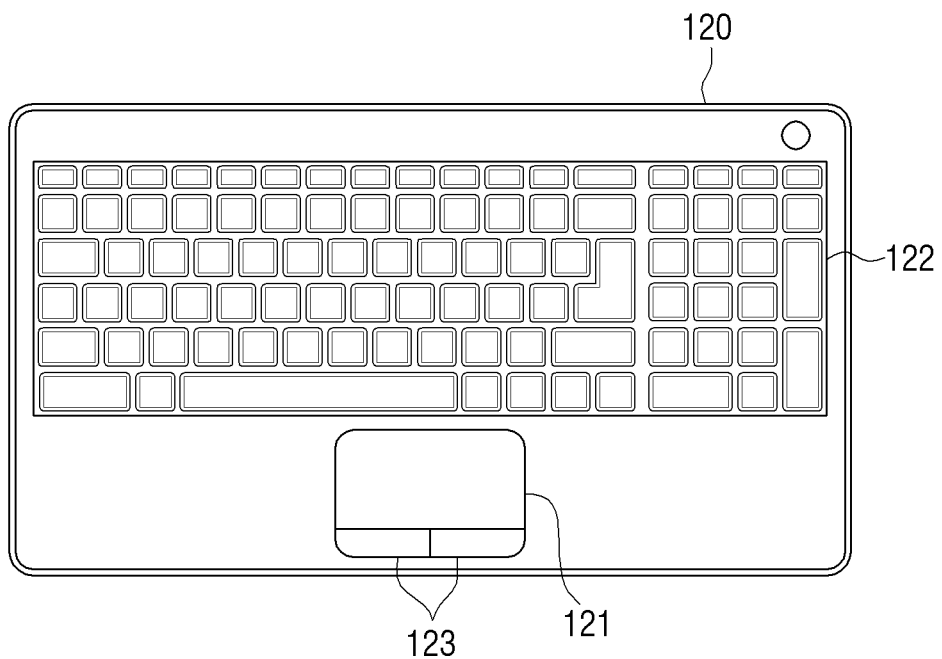
FIG. 4 illustrates a second body of the electronic apparatus according to exemplary embodiments of the present general inventive concept.

FIG. 4 illustrates the second body 120 of the electronic apparatus 100 according to exemplary embodiments of the present general inventive concept.

Referring to FIGS. 4 and 6, the keyboard 122 may be disposed on the front side 132 of the second body 120. The touchpad 121 is disposed below the front side 132 of the second body 120, and a plurality of buttons 123 functioning as left and right buttons of a mouse is disposed below the touchpad 121. The buttons 123 of a push type or a touch type may be formed.

FIG. 5 illustrates operation modes corresponding to the angle and the position of the first body 110 and the second body 120 of the electronic apparatus 100 according to exemplary embodiments of the present general inventive concept.

The three operation modes (the power-saving mode, the electronic notebook mode, and the tablet mode) corresponding to the angle of the first body 110 and the second body 120 have been mentioned with respect to FIG. 1. Hereafter, the operation modes based on the angle and the location information of the first body 110 and the second body 120 are explained.

Referring to FIG. 5, the operation modes according to embodiments of the present general inventive concept include a clamshell mode 510, a stand mode 520, a tent mode 530, a tablet mode 540, and a book mode 550.

The clamshell mode 510 folds the first body 110 and the second body 120 in an x-y plane (see FIG. 6) by a predetermined amount. For example, when the angle of the first body 110 and the second body 120 is in the range of about 60 degrees to about 180 degrees (see, e.g., FIG. 6), the clamshell mode 510 is utilized so that the electronic apparatus operates in a clamshell mode.

The clamshell mode 510 is useful when the first body 110 and the second body 120 are coupled with a hinge and folded in an x-y plane (see FIG. 6) by a predetermined amount, and the electronic apparatus 100 is used like an electronic notebook. For example, the display part 111 of the first body 110 may display the operation screen and the touchpad 121, and the keyboard 122 of the second body 120 may receive the user input.

In this case, the electronic apparatus 100 may activate the functions of all of its components.

As illustrated in FIG. 5, in the stand mode 520 the first body 110 uses the second body 120 as a horizontal base. For example, when the angle of the first body 110 and the second body 120 is in the range of about 270 degrees to about 360 degrees, and the second body 120 is used as a horizontal base to support the first body 110, the stand mode 520 is utilized. That is, the electronic apparatus operates in a stand mode 520.

As illustrated in FIG. 5, when the first body 110 is supported by a horizontal base consisting of the second body 120, the electronic apparatus 100 may stand 520 on the ground. Thus, the electronic apparatus 100 is useful as a digital clock, a digital frame, a broadcasting unit that displays a broadcast multimedia transmission for a time period that is greater than a predetermined amount of time, and a video viewing unit. For example, the display part 111 of the first body 110 displays the operation screen, and the second body 120 serves as the support.

In this case, the electronic apparatus 100 may deactivate the touchpad 121 and the keyboard 122 of the second body 120, and thus may prevent the user's unintended input.

As illustrated in FIG. 5, in the tent mode 530, the first body 110 and the second body 120 form a tent shape. For example, when the angle of the first body 110 and the second body 120 is in a range of about 180 degrees to about 360 degrees (see FIG. 6), frames of the first body 110 and the second body 120 touch the ground as illustrated in FIG. 5, the electronic apparatus operates in the tent mode 530.

In the tent mode 530, the first body 110 and the second body 120 are arranged to put the electronic apparatus 100 on the ground to form a triangular shape with a flat surface. During the charging, the electronic apparatus 100 is useful as a digital clock, a digital frame, a broadcasting unit that displays a broadcast multimedia transmission for a time period that is greater than a predetermined amount of time, and a video viewing unit. Since the user uses only the display part 111 of the first body 110 on the front side 134 of the first body 110, the touchpad 121 and the keyboard 122 of the second body 120 may be deactivated.

In the tablet mode 540, the electronic apparatus 110 is folded so that the rear side 135 of the first body 110 and rear side 133 of the second body 120 contact each other. For example, when the angle of the first body 110 and the second body 120 is about 360 degrees, the electronic apparatus 100 operates in the tablet mode 540.

In the tablet mode 540, the electronic apparatus 100 may be held with the hand of the user, compared to the stand mode 520, to facilitate portability and the user manipulation. In this case, the electronic apparatus 100 can deactivate the touchpad 121 and the keyboard 122 of the second body 120, and thus prevent the user's unintended input.

As illustrated in FIG. 5, in the book mode 550, the first body 110 and the second body 120 are arranged to have an angle of about 30 degrees to about 180 degrees therebetween. For example, when the angle of the first body 110 and the second body 120 is in the range of about 30 degrees to about 180 degrees, and the first body 110 and the second body 120 are placed on a same straight line as illustrated in FIGS. 5 and 6, the electronic apparatus operates in the book mode 550.

The book mode 550 is useful when the electronic apparatus 100 is used like an e-book. For example, the display part 111 of the first body 110 may display a page of the book, and the keyboard 122 and the touchpad 121 of the second body 120 may receive the user input.

When the electronic apparatus 100 enters the stand mode 520 or the tablet mode 540, the controller 140 deactivates the input function of the touchpad 121 of the second body 120. In exemplary embodiments of the present general inventive concept, when the electronic apparatus 100 enters the stand mode 520 or the tablet mode 540, the controller 140 may deactivate the input function of the touchpad 121 of the second body 120, concurrently increase the sensitivity of the touchpad 121, and detect the contact of the human body using the touchpad 121 of the enhanced sensitivity. That is, the input from the touchpad 121 to the OS may be blocked using the software, and enhanced sensitivity may be used to detect the contact of the human body.

FIG. 6 illustrates the rotation of the hinge part 130 of the electronic apparatus 100 according to exemplary embodiments of the present general inventive concept.

Referring to FIG. 6, side views of the electronic apparatus 100 are depicted when the angle of the first body 110 and the second body 120 is 0 degrees, between 90 degrees and 180 degrees, and 360 degrees.

As illustrated in FIG. 6, the relative positions of the display part 111, the touchpad 121, and the keyboard 122 may be obtained according to the rotation of the first body 110 and the second body 120.

According to exemplary embodiments of the present general inventive concept, the first body 110 and the second body 120 are coupled by the hinge part 130, and the hinge part 130 allows the rotation of the first body 110 and the second body 120. The hinge part of FIG. 6 may rotate in the order of 130-$a$, 130-$b$, and 130-$c$ so that the first body 110 and the second body 120 may rotate from 0 degrees to 360 degrees. That is, at 0 degrees a front side 134 of the first body 110 is in contact with a front side 132 of the second body, and at 360 degrees a rear side 135 of the first body 110 is in contact with a rear side 133 of the second body 120.

Figure 7:
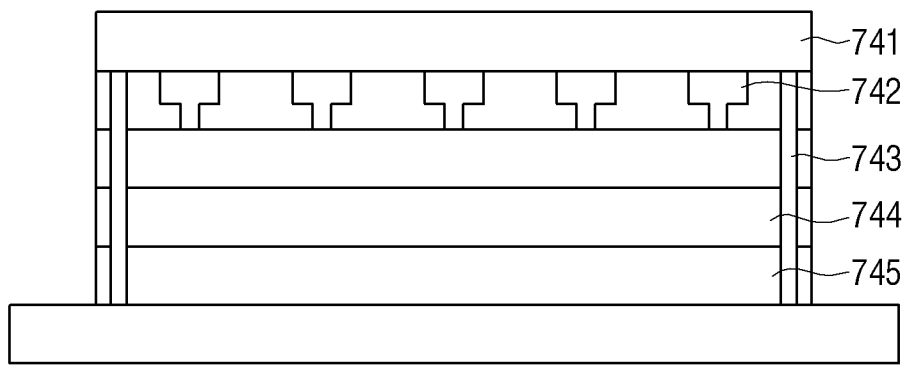
FIG. 7 illustrates a cross-sectional view of a touchpad according to exemplary embodiments of the present general inventive concept.

FIG. 7 illustrates a cross-sectional view of the touchpad 121 according to exemplary embodiments of the present general inventive concept.

Referring to FIG. 7, the touchpad 121 includes a magnetic field layer 741, an x-axis pattern sensor layer 742, a y-axis pattern sensor layer 743, a ground layer 744, and a Surface Mount Device (SMD) layer 745.

Figure 8:
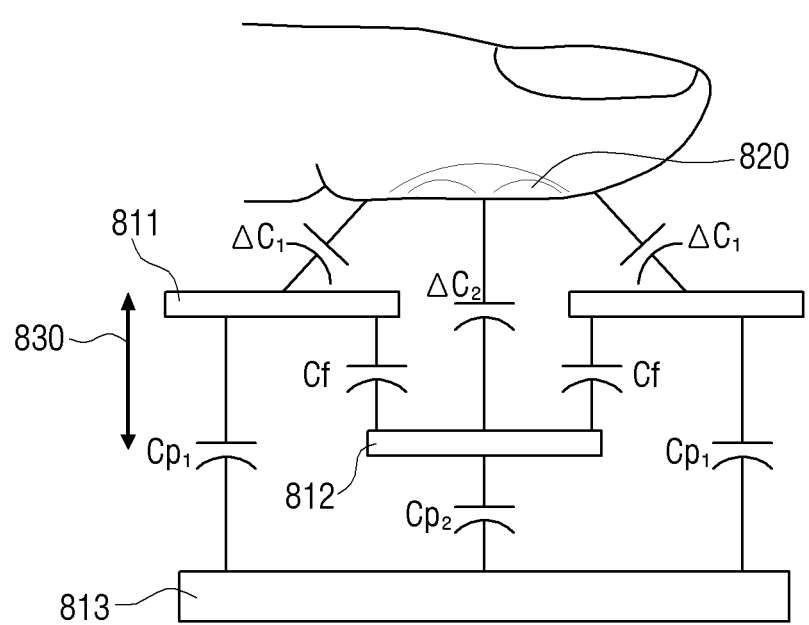
FIGS. 8 and 9 are diagrams illustrating operations of the touchpad according to exemplary embodiments of the present general inventive concept.
Figure 9:
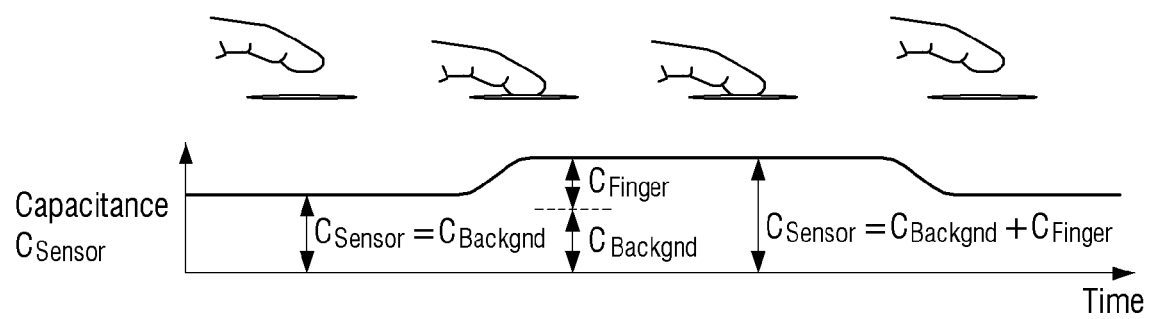

The operational principle of the touchpad 121 is explained by referring to FIGS. 8 and 9.

FIGS. 8 and 9 are diagrams illustrating the operations of the touchpad 121 according to exemplary embodiments of the present general inventive concept.

Referring to FIG. 8, when a finger 820 approaches, a capacitance 830 of a touch sensor surface 811 increases according to a microcurrent of the human body. In detail, the location of the finger may be recognized by scanning a capacitance $C_{p1}$ between the touch sensor surface 811 of the x-axis pattern sensor layer 742 and a substrate 813, scanning a capacitance $C_{p2}$ between a touch sensor surface 812 of the y-axis pattern sensor layer 743, and the substrate 813, scanning a capacitance $C_f$ between the touch sensor surface 811 of the x-axis pattern sensor layer 742 and the touch sensor surface 812 of the y-axis pattern sensor layer 743, and sensing a capacitance change $\Delta C_2 - \Delta C_1$ according to the approach of the finger relative to the initial capacitance $C_{p1} + C_f$. When the recognized location of the finger is sent to a driver in real time, the driver may generate a window event corresponding to the finger movement.

FIG. 9 is a graph illustrating the change of the capacitance of the touchpad 121 according to exemplary embodiments of the present general inventive concept. The contact of the human body may be detected using the capacitance difference as illustrated in FIG. 8. For example, a capacitance sensor may detect the capacitance change $\Delta C$, $C_{finger}$ of 0.1 to about 0.01 pF.

The touchpad 121 according to exemplary embodiments of the present general inventive concept may increase the sensing sensitivity by lowering a sensing threshold of the capacitance sensor, thus detecting a predetermined capacitance change $\Delta C$, $C_{finger}$. More specifically, the sensing sensitivity may be adjusted by changing a firmware code of the touchpad 121.

When the sensing threshold is lowered by a predetermined amount so as to increase the sensitivity, the approach of the human body may be detected without the complete contact. The accuracy of the pointing location may decrease, whereas the approach of the human body up to 2 to about 3 mm may be detected. Thus, the proximity and the contact of the human body may be detected by increasing the sensing sensitivity of the touchpad 121. Besides the direct body contact, even when the human body is covered by clothes, its contact may be detected.

Figure 10:
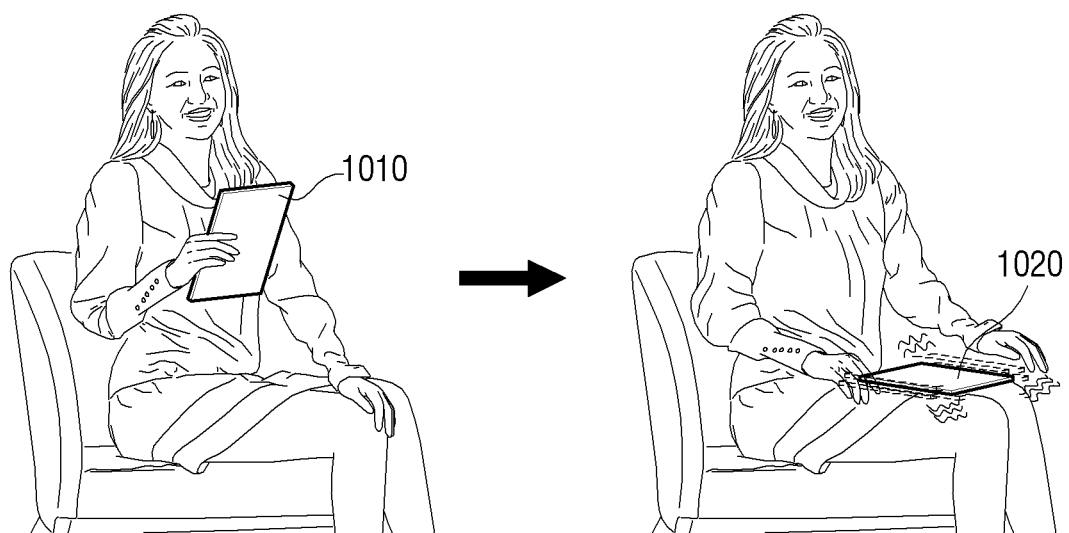
FIGS. 10, 11, and 12 illustrate a control method when the touchpad of the increased sensing sensitivity detects contact of a human body according to exemplary embodiments of the present general inventive concept.
Figure 11:
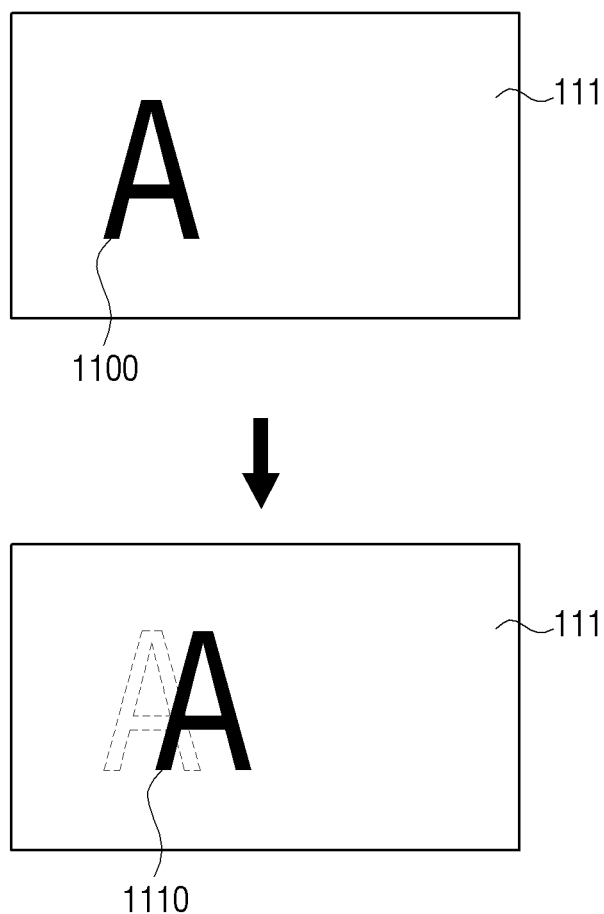
Figure 12:
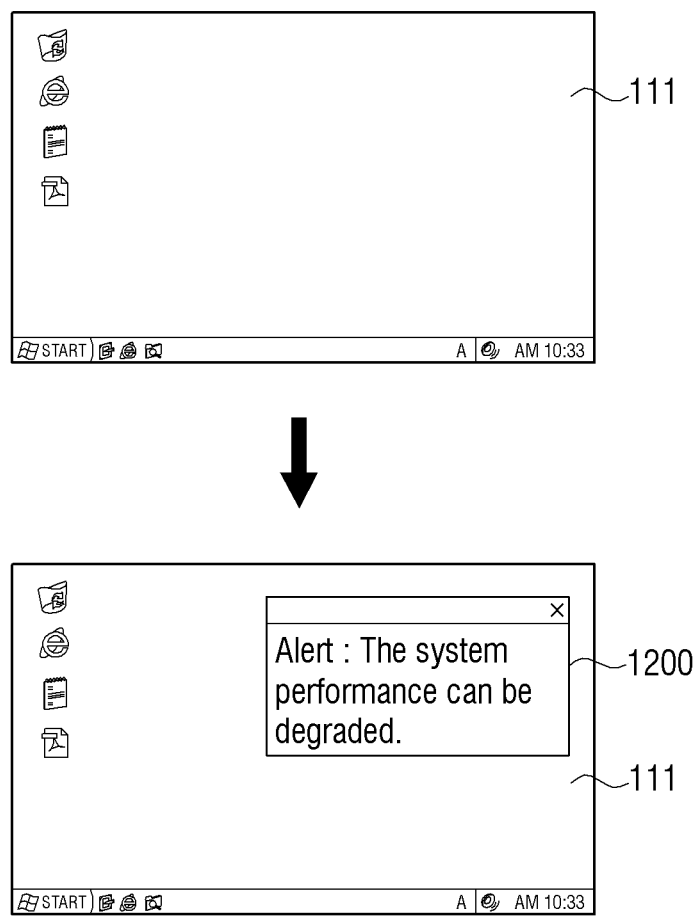

FIGS. 10, 11 and 12 illustrate a control method when the touchpad of the increased sensing sensitivity detects the human body contact according to exemplary embodiments of the present general inventive concept.

In a preset operation mode, the controller 140 of the electronic apparatus 100 may detect the contact of the human body by increasing the sensing sensitivity of the touchpad 121.

Herein, the preset operation mode indicates the tablet mode or the stand mode which allows the front side of the second body 120 to contact the human body.

FIG. 10 illustrates the haptic function of the electronic apparatus 100 when the front side 132 of the second body 120 is in contact with the human body in the tablet mode or the stand mode.

Referring to FIG. 10, the user is holding the electronic apparatus 100 of the tablet mode by the hand in position 1010. Herein, when the user puts the second body 120 down on his/her knees so that the electronic apparatus 100 is in a position 1020 with the front side 132 of the second body 120 facing downward, the touchpad 121 disposed in the front side 132 of the second body 120 may detect the human body contact. Upon detecting the human body contact, the controller 140 may control the vibration part 180 to vibrate the electronic apparatus 100 during a preset time (e.g., when the electronic apparatus 100 is disposed in position 1020).

As such, the electronic apparatus 100 may provide intuitive handling to the user based on the vibration of the electronic apparatus 100.

FIG. 11 depicts the control method of the display part 111 of the electronic apparatus 100 when the front side 132 of the second body 120 contacts the human body in the tablet mode or the stand mode.

Referring to FIG. 11, when the user puts the second body 120 down on his/her knees with the front side 132 facing downward as shown in FIG. 10, the human body contact is detected by the touchpad 121, and the controller 140 may control the display part 111 to vibrate an image displayed in the display part 111 from a first position 1100 to another position 1110).

As such, the electronic apparatus 100 may provide intuitive perception to the user because the user becomes aware of the human body contact with the tablet when the user feels the tablet vibrating.

FIG. 12 illustrates the control method of the display part 111 of the electronic apparatus 100 when the front side 132 of the second body 120 contacts the human body in the tablet mode or the stand mode.

Referring to FIG. 12, when the user puts the second body 120 down on his/her knees with the front side facing downward as shown in FIG. 10, the human body contact is detected by the touchpad 121, and the controller 140 may provide a preset user interface (UI) to the display part 111.

For example, an alert window 1200 of FIG. 12 may be displayed, and an information window showing the status information of the electronic apparatus 100 may be displayed.

As such, the electronic apparatus 100 may provide the intuitive perception to the user based on a message in the alert window.

Figure 13:
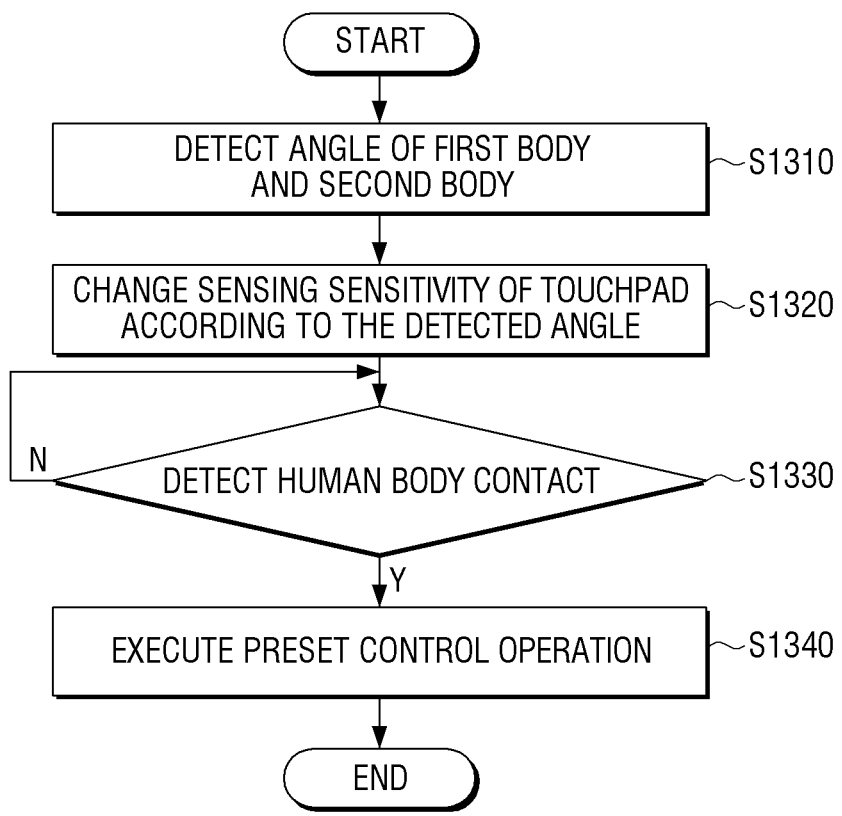
FIG. 13 is a flowchart illustrating the control method of the electronic apparatus according to exemplary embodiments of the present general inventive concept.

FIG. 13 is a flowchart of the control method of the electronic apparatus according to exemplary embodiments of the present general inventive concept.

The electronic apparatus 100 detects the angle of the first body 110 and the second body 120 at operation S1310. In detail, the sensor part 160 of the electronic apparatus 100 may detect the angle. The angle detection method has been described in relation with the sensor part 160 of FIG. 2 and shall be omitted here.

The method changes the sensing sensitivity of the touchpad 121 according to the detected angle at operation S1320. In detail, the method may change the operation mode according to the detected angle and adjust the sensing sensitivity of the touchpad 121 according to the operation mode.

Herein, when the operation mode is the tablet mode, the sensing sensitivity of the touchpad 121 may be increased to detect the human body contact.

Besides the method for increasing the sensing sensitivity of the touchpad 121 according to the operation mode, when the detected angle is the preset angle, the sensing sensitivity of the touchpad 121 may be increased to detect the human body contact through the touchpad 121 according to various embodiments of the present general inventive concept.

When the touchpad 121 detects the human body contact at operation S1330, the method executes a preset control operation S1340.

According to exemplary embodiments of the present general inventive concept, to maintain the temperature of the electronic apparatus 100 at an adequate level, the preset control operation may decrease the operating frequency of the electronic apparatus 100 and may increase the rotation speed of the cooling fan.

The preset control operation may reduce the emission of the electromagnetic waves by decreasing the transmission power of the antenna 151.

The preset control operation may provide the preset user interface (UI) to the display part 111.

The control method of the electronic apparatus of FIG. 13 may be fulfilled in the electronic apparatus 100 of FIG. 1 or other electronic apparatuses.

As set forth above, according to various embodiments of the present general inventive concept, the control method of the electronic apparatus may detect the human body contact by use of the touchpad capable of changing the sensing sensitivity in lieu of the proximity sensor.

Figure 14:
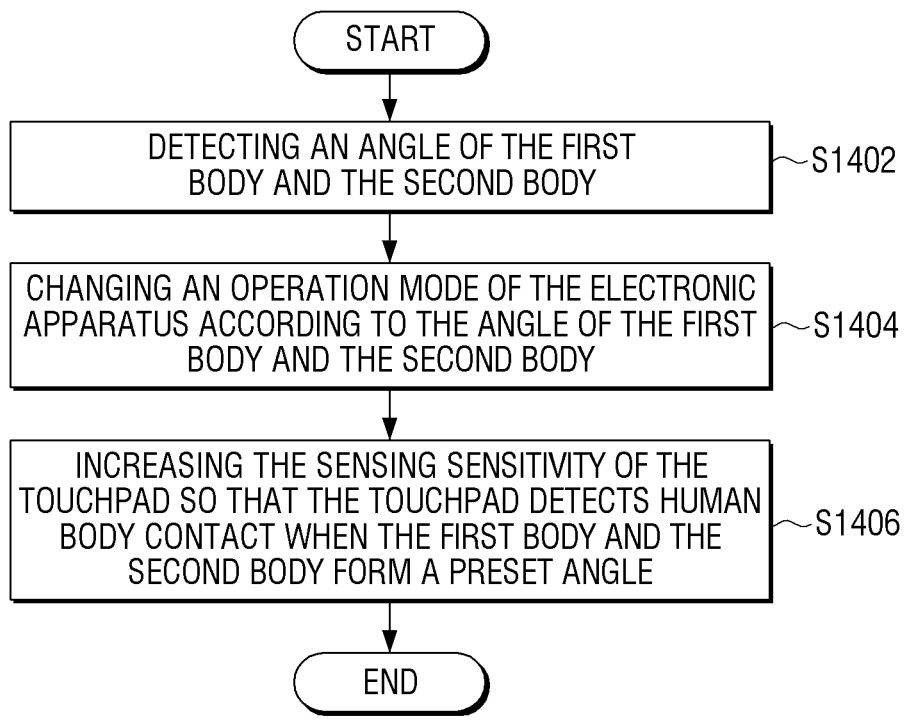
FIG. 14 is a flowchart illustrating the control method of the electronic apparatus according to exemplary embodiments of the present general inventive concept.

FIG. 14 is a flowchart illustrating the control method of the electronic apparatus according to exemplary embodiments of the present general inventive concept. At operation S1402, the electronic apparatus 100 detects an angle of the first body and the second body. The electronic apparatus 100 changes an operation mode according to the angle of the first body and the second body at operation S1404. The electronic apparatus 100 increases the sensing sensitivity of the touchpad so that the touchpad detects human body contact when the first body and the second body form a preset angle at operation S1406.

Figure 15:
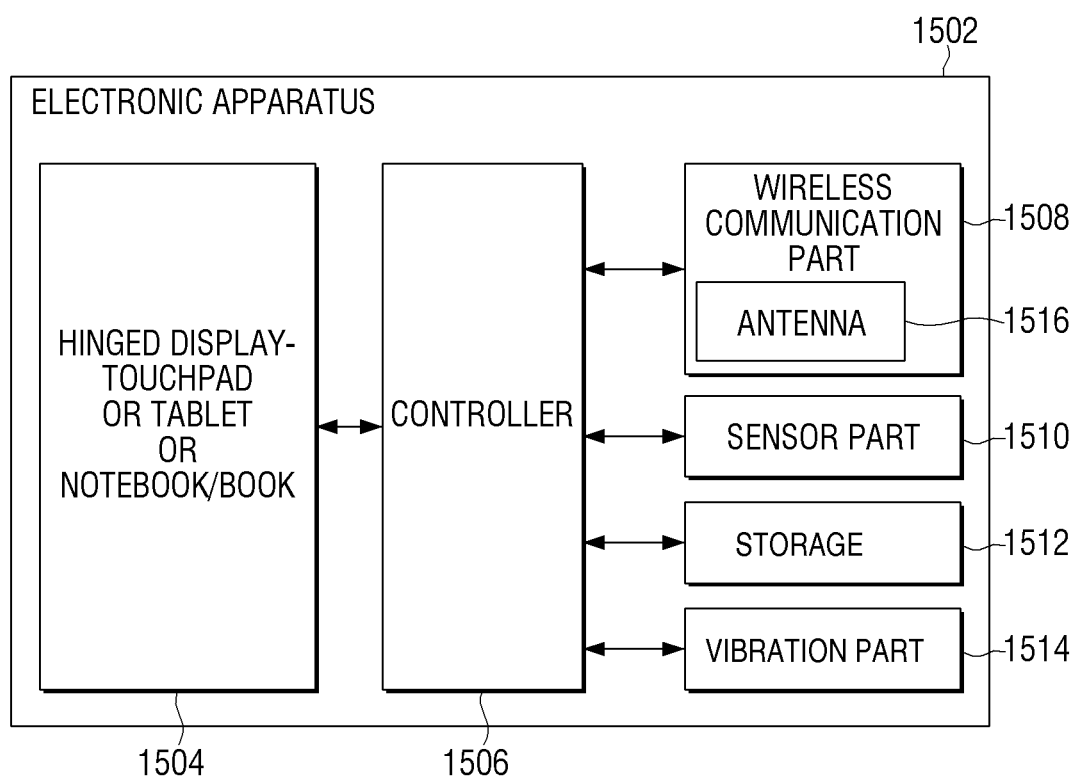
FIG. 15 is a block diagram illustrating an electronic apparatus according to exemplary embodiments of the present general inventive concept.

FIG. 15 is a block diagram of an electronic apparatus according to exemplary embodiments of the present general inventive concept. The electronic apparatus 1502 includes a hinged display-touchpad 1504 that is arranged to rotate 360 degrees and has a preset angle formed by a display coupled to a touchpad by a hinge. A controller 1506 detects the preset angle formed by the display with the touchpad, and changes an operation mode of the electronic apparatus according to the preset angle formed by the display with the touchpad so as to increase the sensing sensitivity of the touchpad so that the touchpad detects human body contact when the display and the touchpad form the preset angle. For example, operation modes may include a power-saving mode, an electronic notebook or book mode, a clamshell mode, a tent mode, a stand mode, or a tablet mode.

Referring to FIG. 15, the electronic apparatus 1502 may include the hinged display-touchpad 1504, the controller 1506, a wireless communication part 1508, a sensor part 1510, a storage 1512, and a vibration part 1514. The operations of the hinged display-touchpad 1504 are in accordance with the descriptions for the first body 110 that includes the display part 111, the second body 120 that includes the touchpad 121, and the hinge part 130 that connects the first body 110 and the second body 120. That is, the hinged display-touchpad includes the first body 110, the second body 211, and the hinge part 130. The operations of the controller 1506, the wireless communication part 1508, the antenna 1516, the sensor part 1510, the storage 1512, and the vibration part 1514 are in accordance with the operations of the controller 140, the wireless communication part 150, the antenna 151, the sensor part 160, the storage 170, and the vibration part 180.

When the preset angle is an angle between about zero degrees and about 30 degrees, the operation mode of the electronic apparatus is a power-saving mode. When the preset angle is an angle between about 30 degrees and about 180 degrees, the operation mode of the electronic apparatus is an electronic notebook or book mode, and when the preset angle is an angle between about 60 degrees and about 180 degrees, the operation mode of the electronic apparatus is a clamshell mode. When the preset angle is an angle from about 180 degrees to about 360 degrees, the operation mode of the electronic apparatus is a tent mode. Within the ten mode, when the preset angle is an angle from about 270 degrees to about 360 degrees, the operation mode of the electronic apparatus is a stand mode, and when the preset angle is an angle of about 360 degrees, the operation mode of the electronic apparatus is a tablet mode.

As illustrated in FIG. 2, the wireless communication part 150 may communicate with an external device using the antenna 151. In detail, the wireless communication part 150 may communicate with various external devices according to various communication schemes. The wireless communication part 150 may include various communication modules such as a broadcasting reception module, a short-range wireless communication module, a wireless communication module, and a GPS module.

Herein, the external device may include at least one of other devices, a mobile phone, a smartphone, a tablet computer, a computer server, and a digital TV.

The sensor part 160 may calculate the angle of the first body 110 and the second body 120. In detail, the sensor part 160 includes any one of a geomagnetic sensor, an acceleration sensor, a hinge sensor, and a touch sensor.

The methods according to various embodiments of the present general inventive concept may be programmed and stored to various storage media. Hence, the methods may be realized in a variety of electronic apparatuses to execute the storage media.

As illustrated in FIGS. 6 and 15, exemplary embodiments of the present general inventive concept may also provide an electronic apparatus 100 that includes a tablet 1504 having a first body 110 connected to a second body 120 by a hinge 130-c, where the first body 110 is rotated to form a preset angle of about 360 degrees with the second body 120, and a controller 1506 to detect the preset angle formed by the first body 110 with the second body 120, to set an operation mode of the electronic apparatus 100 according to the preset angle formed by the first body 110 with the second body 120, and to increase a sensing sensitivity of the second body 120 so that the second body 120 detects human body contact when the first body 110 and the second body 120 form the preset angle. The first body 110 may be a display, and the second body 120 may be a touchpad.

As illustrated in FIGS. 6 and 15, exemplary embodiments of the present general inventive concept may also provide an electronic apparatus 100 that includes an electronic notebook or book 1504 having a first body 110 connected to a second body 120 by a hinge 130-b where the first body 110 is rotated to form a preset angle between about 30 degrees and about 180 degrees with the second body 120, and a controller to detect the preset angle formed by the first body 110 with the second body 120, to set an operation mode of the electronic apparatus 100 according to the preset angle formed by the first body 110 with the second body 120, and to increase a sensing sensitivity of the second body 120 so that the second body 120 detects human body contact when the first body 110 and the second body 120 form the preset angle. The first body 110 may be a display, and the second body 120 may be a touchpad.

When the preset angle is an angle between about 60 degrees and about 180 degrees, the operation mode of the electronic apparatus is a clamshell mode.

In detail, according to an embodiment of the present general inventive concept, a non-transitory computer readable medium may contain a program for sequentially fulfilling an operation to detect the angle of the first body 110 and the second body 120, an operation to switch the operation mode of the electronic apparatus 100 according to the angle of the first body 110 and the second body 120, and an operation for, when the first body 110 and the second body 120 form the preset angle, increasing the sensing sensitivity of the touchpad 121 so that the touchpad 121 detects the human body contact.

The non-transitory computer readable medium indicates a device-readable medium for storing data semi-permanently, rather than the medium such as register, cache, and memory, which store the data for a short time. Specifically, the various applications or programs may be stored to the non-transitory computer readable medium such as a compact disk (CD), a digital videodisc (DVD), hard disc, BlueRay disc, a universal serial bus (USB), memory card, and a read only memory (ROM).

The present general inventive concept may also be embodied as computer-readable codes on a non-transitory computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium may also be distributed over network coupled computer systems so that the computer-readable code is stored and executed in a distributed fashion. The computer-readable transmission medium may be transmitted through carrier waves or signals (e.g., wired or wireless data transmission through the Internet). Also, functional programs, codes, and code segments to accomplish the present general inventive concept may be easily construed by programmers skilled in the art to which the present general inventive concept pertains.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An electronic apparatus, comprising:
a first body comprising a display part formed on a front side;
a second body comprising a touchpad to change a sensing sensitivity and a non-touchpad not to change the sensing sensitivity, the sensing sensitivity comprising a first sensing sensitivity and a second sensing sensitivity which are capable of sensing a user's touch;
a hinge part to connect the first body and the second body and to rotate 360 degrees; and
a controller to change an operation mode of the electronic apparatus according to an angle of the first body and the second body, and to increase the sensing sensitivity of the touchpad formed on a front side of the second body from the first sensing sensitivity to the second sensing sensitivity when the first body and the second body form a preset angle and a rear side of the first body is in contact or adjacent to a rear side of the second body.

2. The electronic apparatus of claim 1, wherein the controller changes the operation mode of the electronic apparatus to a tablet mode when the first body and the second body form a first preset angle, and changes the operation mode of the electronic apparatus to an electronic notebook mode when the first body and the second body form a second preset angle.

3. The electronic apparatus of claim 1, wherein the controller changes at least one of an operating frequency of the electronic apparatus and a rotation speed of a cooling fan of the electronic apparatus, when the touchpad of the increased sensing sensitivity detects a human body contact.

4. The electronic apparatus of claim 1, further comprising:
a wireless communication part to communicate with an external device using an antenna,
wherein the controller decreases a power of the antenna when the touchpad of the increased sensing sensitivity detects a human body contact.

5. The electronic apparatus of claim 1, wherein the controller provides a preset User Interface (UI) to the display part when the touchpad of the increased sensing sensitivity detects a human body contact.

6. The electronic apparatus of claim 1, further comprising:
a vibration part,
wherein the controller controls the vibration part to vibrate during a preset time, when the touchpad of the increased sensing sensitivity detects a human body contact.

7. The electronic apparatus of claim 1, wherein the touchpad adjusts a sensing threshold of a touchpad capacitance which varies according to an approach of a human body, to change the sensitivity.

8. An electronic apparatus comprising:
a first body comprising a display part formed on a front side;
a second body comprising a touchpad capable of changing a sensing sensitivity and a non-touchpad not to change the sensing sensitivity, the sensing sensitivity comprising a first sensing sensitivity and a second sensing sensitivity which are capable of sensing a user's touch;
a hinge part to connect the first body and the second body; and
a controller to change the sensing sensitivity of the touchpad from the first sensing sensitivity to the second sensing sensitivity by increasing the first sensing sensitivity based on an angle of the first body and the second body.

9. The electronic apparatus of claim 8, wherein the controller detects a human body contact by increasing the sensing sensitivity of the touchpad, when the first body and the second body form a first preset angle and a rear side of the first body is in contact or adjacent to a rear side of the second body.

10. The electronic apparatus of claim 9, wherein the controller changes at least one of an operating frequency of the electronic apparatus and a rotation speed of a cooling fan of the electronic apparatus, when the touchpad of the increased sensing sensitivity detects the human body contact.

11. The electronic apparatus of claim 9, further comprising:
a wireless communication part to communicate with an external device using an antenna,
wherein the controller decreases a power of the antenna, when the touchpad of the increased sensing sensitivity detects the human body contact.

12. The electronic apparatus of claim 8, wherein the touchpad adjusts a sensing threshold of a touchpad capacitance which varies according to an approach of the human body, to change the sensitivity.

13. A control method of an electronic apparatus which includes a first body that includes a display part formed on a front side, a second body that includes a touchpad to change a sensing sensitivity and a non-touchpad not to change the sensing sensitivity, and a hinge part to connect the first body and the second body and to rotate 360 degrees, the method comprising:
detecting an angle of the first body and the second body;
changing an operation mode of the electronic apparatus according to the angle of the first body and the second body; and
increasing the sensing sensitivity of the touchpad formed on a front side of the second body from a first sensing sensitivity to a second sensing sensitivity, when the first body and the second body form a preset angle and a rear side of the first body is in contact or adjacent to a rear side of the second body.

14. The control method of claim 13, wherein the operation to change the operation mode comprises:
changing the operation mode of the electronic apparatus to a tablet mode, when the first body and the second body form a first preset angle; and
changing the operation mode of the electronic apparatus to an electronic notebook mode, when the first body and the second body form a second preset angle.

15. The control method of claim 13, further comprising:
changing at least one of an operating frequency of the electronic apparatus and a rotation speed of a cooling fan of the electronic apparatus, when the touchpad of the increased sensing sensitivity detects a human body contact.

16. The control method of claim 13, further comprising:
decreasing a power of an antenna of the electronic apparatus, when the touchpad having the increased sensing sensitivity detects a human body contact.

17. The control method of claim 13, further comprising:
providing a preset User Interface (UI) to the display part, when the touchpad of the increased sensing sensitivity detects a human body contact.

18. The control method of claim 13, further comprising:
controlling a vibration part of the electronic apparatus to vibrate during a preset time, when the touchpad of the increased sensing sensitivity detects a human body contact.

19. The control method of claim 13, wherein the touchpad adjusts a sensing threshold of a touchpad capacitance which varies according to an approach of a human body, to change the sensitivity.

20. A non-transitory computer-readable recording medium having a program, that when executed by a computer, carries out a method of controlling an electronic apparatus that includes a first body having a display part formed on a front side, a second body having a touchpad capable of changing a sensing sensitivity and a non-touchpad not to change the sensing sensitivity, and a hinge part to connect the first body and the second body and to rotate 360 degrees, the method comprising:

detecting an angle of the first body and the second body;

changing an operation mode of the electronic apparatus according to the angle of the first body and the second body; and increasing the sensing sensitivity of the touchpad from a first sensing sensitivity to a second sensing sensitivity when the first body and the second body form a preset angle and a rear side of the first body is in contact or adjacent to a rear side of the second body.

21. An electronic apparatus, comprising:

a hinged display-touchpad arranged to rotate 360 degrees and have a preset angle formed by a display coupled to a touchpad by a hinge; and a controller to detect the preset angle formed by the display with the touchpad, to change an operation mode of the electronic apparatus according to the preset angle formed by the display with the touchpad, and to increase a sensing sensitivity of the touchpad from a first sensing sensitivity to a second sensing sensitivity when the display and the touchpad form the preset angle and a rear side of the display is in contact or adjacent to the touchpad.

22. A control method of an electronic apparatus which includes a first body that includes a display part formed on a front side, a second body that includes a touchpad to change a sensing sensitivity and a non-touchpad not to change the sensing sensitivity, and a hinge part to connect the first body and the second body and to rotate about 360 degrees, the method comprising:

detecting an angle of the first body and the second body;

changing a sensing sensitivity of the touchpad according to the detected angle, the sensing sensitivity comprising a first sensing sensitivity and a second sensing sensitivity which are capable of sensing a user's touch; and repeatedly determining whether the electronic apparatus has contacted a human body until contact with a human body occurs; and executing a preset control operation according to the detected angle, where the changing comprises changing the sensing sensitivity by increasing the sensing sensitivity from the first sensing sensitivity to the second sensing sensitivity based on the detected angle.

23. An electronic apparatus, comprising:

a tablet having a first body connected to a second body by a hinge, the first body being rotated to form a preset angle of about 360° with the second body; and a controller to detect the preset angle formed by the first body with the second body, to set an operation mode of the electronic apparatus according to the preset angle formed by the first body with the second body, and to increase a sensing sensitivity of the second body by increasing the sensing sensitivity from a first sensing sensitivity to a second sensing sensitivity when the first body and the second body form the preset angle and a rear side of the first body is in contact or adjacent to a rear side of the second body.

24. An electronic apparatus, comprising:

an electronic notebook or book having a first body connected to a second body by a hinge where the first body is rotated to form a preset angle between about 30 degrees and about 180 degrees with the second body; and a controller to detect the preset angle formed by the first body with the second body, to set an operation mode of the electronic apparatus according to the preset angle formed by the first body with the second body, and to increase a sensing sensitivity of the second body by increasing the sensing sensitivity from a first sensing sensitivity to a second sensing sensitivity when the first body and the second body form the preset angle and a rear side of the first body is in contact or adjacent to the second body.

25. The electronic apparatus of claim 24, wherein the preset angle is an angle between about 60 degrees and about 180 degrees so that the operation mode of the electronic apparatus is a clamshell mode.

\* \* \* \* \*